(12) United States Patent
Shindo et al.

(10) Patent No.: US 10,545,539 B2
(45) Date of Patent: Jan. 28, 2020

(54) ELECTRONIC DEVICE AND LATCH MECHANISM

(71) Applicant: Panasonic Intellectual Property Management Co., Ltd., Osaka (JP)

(72) Inventors: Kenchi Shindo, Osaka (JP); Futoshi Kuriyama, Saga (JP); Tatsuo Kuromoto, Osaka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 0 days.

(21) Appl. No.: 15/951,443

(22) Filed: Apr. 12, 2018

(65) Prior Publication Data
US 2018/0232013 A1    Aug. 16, 2018

Related U.S. Application Data

(63) Continuation of application No. PCT/JP2016/003502, filed on Jul. 28, 2016.

(30) Foreign Application Priority Data

Nov. 6, 2015 (JP) .................. 2015-218848

(51) Int. Cl.
*G06F 1/16* (2006.01)
*H05K 5/02* (2006.01)

(52) U.S. Cl.
CPC .......... *G06F 1/1679* (2013.01); *G06F 1/1616* (2013.01); *H05K 5/02* (2013.01)

(58) Field of Classification Search
CPC ........ G06F 1/16; G06F 1/1679; G06F 1/1616; H05K 5/02; Y10T 16/54028; Y10T 16/54029; Y10T 16/5285
See application file for complete search history.

(56) References Cited

U.S. PATENT DOCUMENTS

2006/0048337 A1* 3/2006 Lowry ................... E05C 17/64
16/342

FOREIGN PATENT DOCUMENTS

JP         07-036569 A      2/1995

* cited by examiner

*Primary Examiner* — Jinhee J Lee
*Assistant Examiner* — Ingrid D Wright
(74) *Attorney, Agent, or Firm* — Renner, Otto, Boisselle & Sklar, LLP

(57) ABSTRACT

A latch mechanism includes a latch and a rotation shaft supporting part. The latch is rotatable around a rotation shaft between a housing position and a lock position, and fixes a first unit and a second unit in a closed state at the lock position. The rotation shaft supporting part rotatably supports the rotation shaft. The latch has a first ring-shaped part disposed coaxially with the rotation shaft. The rotation shaft supporting part has a second ring-shaped part disposed coaxially with the rotation shaft. Heights of the first ring-shaped part and the second ring-shaped part are set such that an area of abutment between the first ring-shaped part and the second ring-shaped part increases as the latch rotates from the lock position to the housing position.

12 Claims, 19 Drawing Sheets

FIG. 1
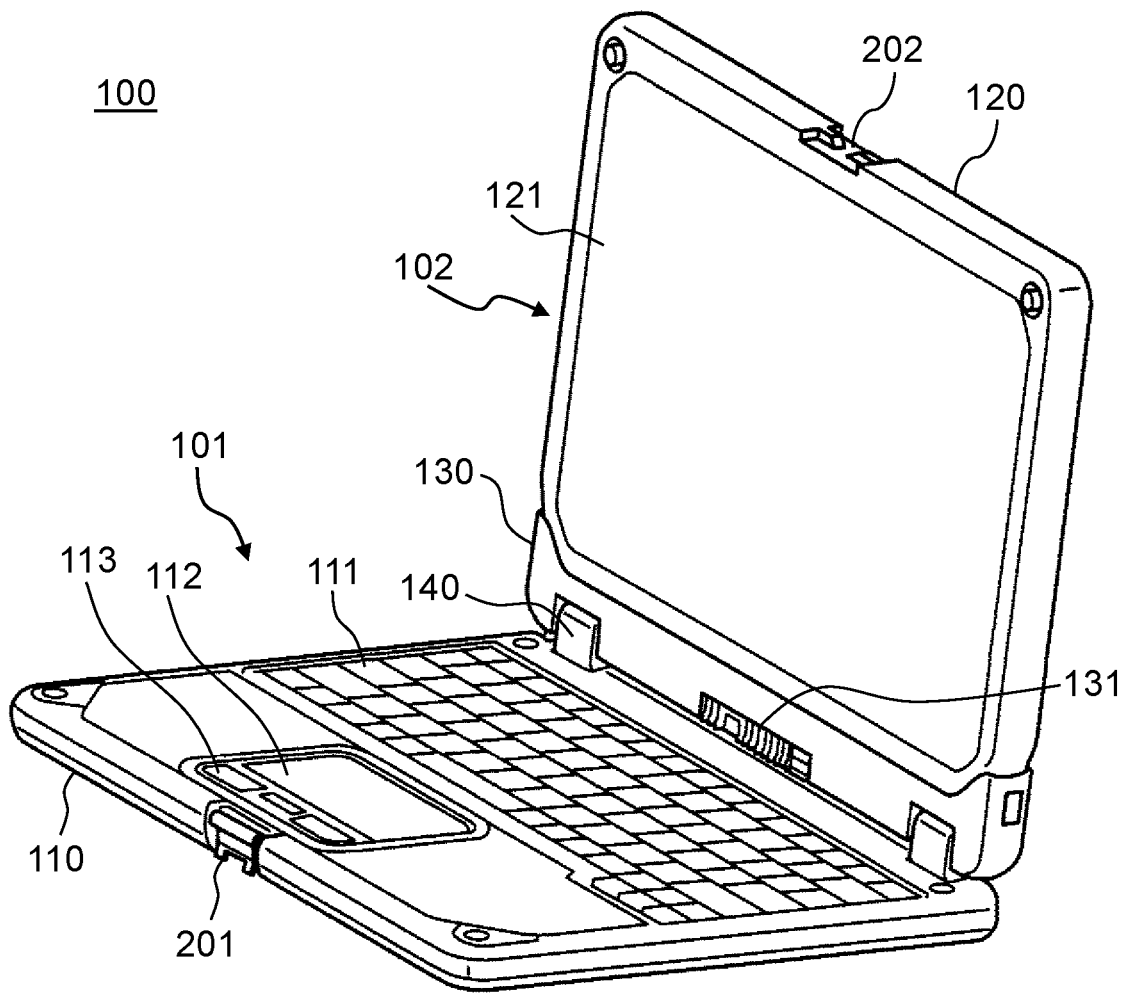
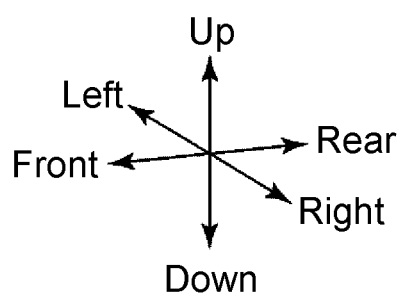

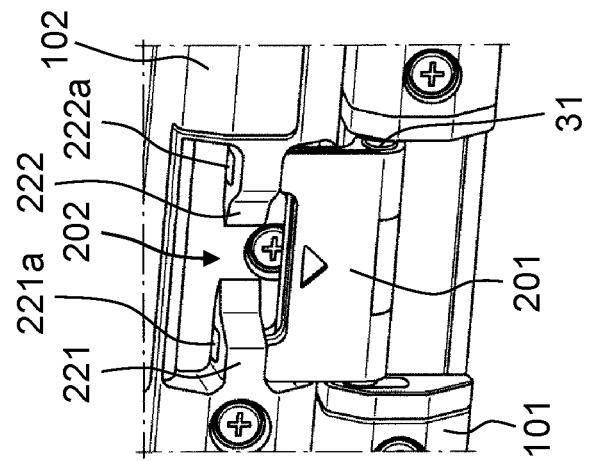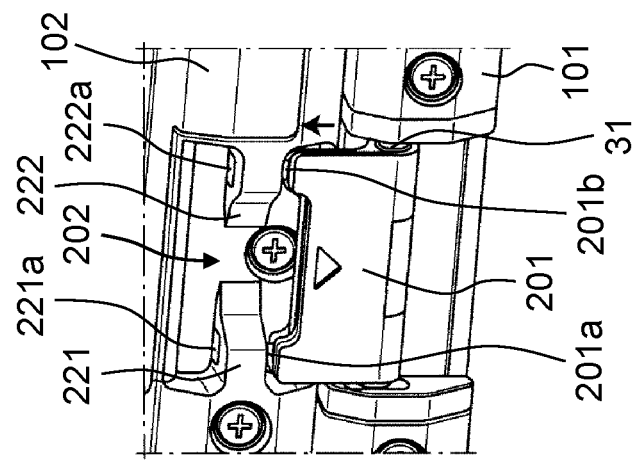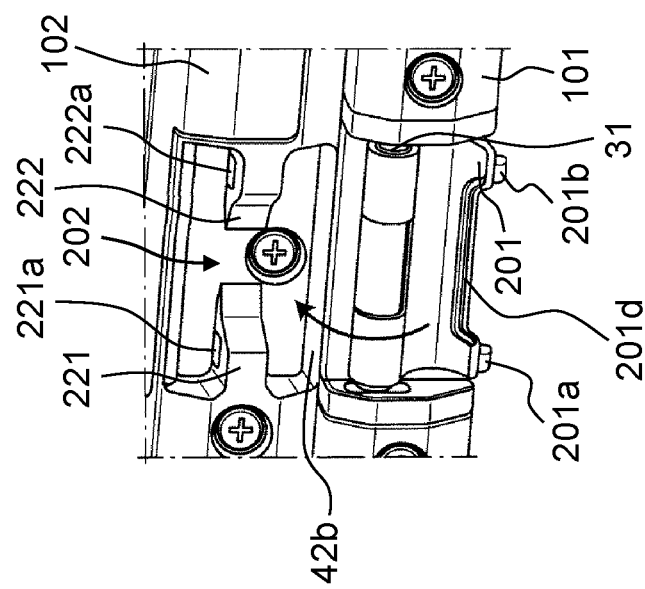

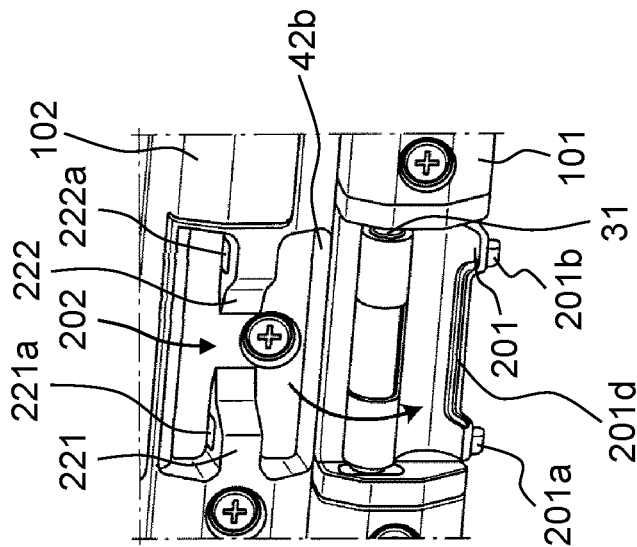
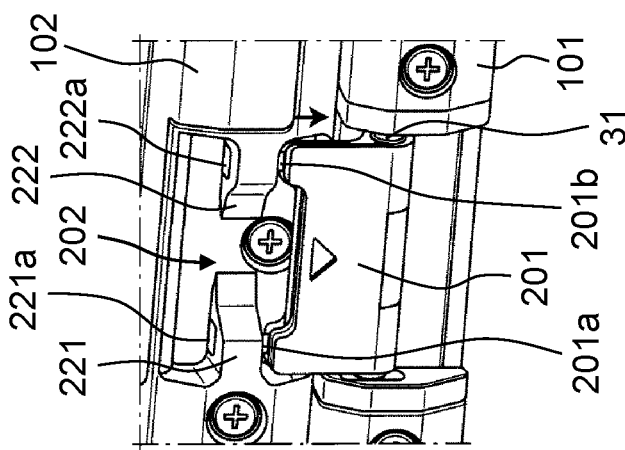
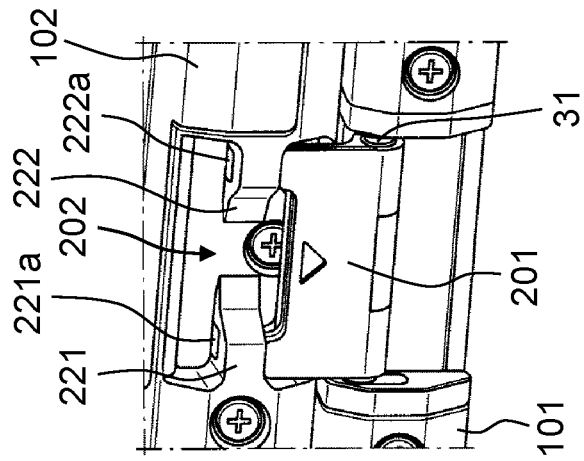

ELECTRONIC DEVICE AND LATCH MECHANISM

BACKGROUND

1. Technical Field

The present disclosure relates to a latch mechanism that holds a second unit in a closed state with respect to a first unit in an electronic device, and an electronic device including the latch mechanism.

2. Description of the Related Art

PTL 1 discloses an electric device including a main body, a display, and a latch mechanism. The display is pivoted to the main body freely openably. The latch mechanism locks the display in a closed state when the display is closed with respect to the main body. This latch mechanism includes a lock pawl, a latch, a biasing part, and a lock part. The lock pawl protrudes outward from a front end surface of the main body. The latch is mounted on a front end surface of the display freely rotatably such that the latch can engage with or disengage from the lock pawl. The biasing part elastically biases the latch in a direction in which the latch engages with the lock pawl. The lock part prohibits rotation of the above-described latch in a lock direction in a state in which the latch and the lock pawl are disengaged. In PTL 1, the lock part prevents the latch from being locked again when the latch is disengaged. Accordingly, the latch mechanism excellent in operability is realized without requiring use of a pop-up spring that causes an increase in size and cost and deterioration in operability.

CITATION LIST

Patent Literature

PTL 1: Unexamined Japanese Patent Publication No. H07-36569

SUMMARY

The present disclosure provides a latch mechanism that holds a second unit in a closed state with respect to a first unit, and an electronic device including the latch mechanism.

In an aspect of the present disclosure, an electronic device including a first unit and a second unit openable to the first unit includes a latch mechanism that fixes the second unit in a closed state with respect to the first unit. The latch mechanism includes a latch and a rotation shaft supporting part. The latch is rotatable around a rotation shaft between a housing position and a lock position, and fixes the first unit and the second unit in a closed state at the lock position. The rotation shaft supporting part rotatably supports the rotation shaft. The latch has a first ring-shaped part disposed coaxially with the rotation shaft. The rotation shaft supporting part has a second ring-shaped part disposed coaxially with the rotation shaft. Heights of the first ring-shaped part and the second ring-shaped part are set such that an area of abutment between the first ring-shaped part and the second ring-shaped part increases as the latch rotates from the lock position to the housing position.

According to the latch mechanism of the present disclosure, the latch can be fixed when the latch is unlocked, and vibration of the latch and noise caused by the vibration can be suppressed.

BRIEF DESCRIPTION OF THE DRAWINGS

FIG. 1 is a perspective view of an information processing device according to a first exemplary embodiment of the present disclosure;

FIG. 6A is a view explaining operation of the latch mechanism when the latch is locked;

FIG. 6B is a view explaining the operation of the latch mechanism when the latch is locked;

FIG. 6C is a view explaining the operation of the latch mechanism when the latch is locked;

FIG. 7A is a view explaining operation of the latch mechanism when the latch is unlocked;

FIG. 7B is a view explaining the operation of the latch mechanism when the latch is unlocked;

FIG. 7C is a view explaining the operation of the latch mechanism when the latch is unlocked;

DETAILED DESCRIPTION

Figure 2:
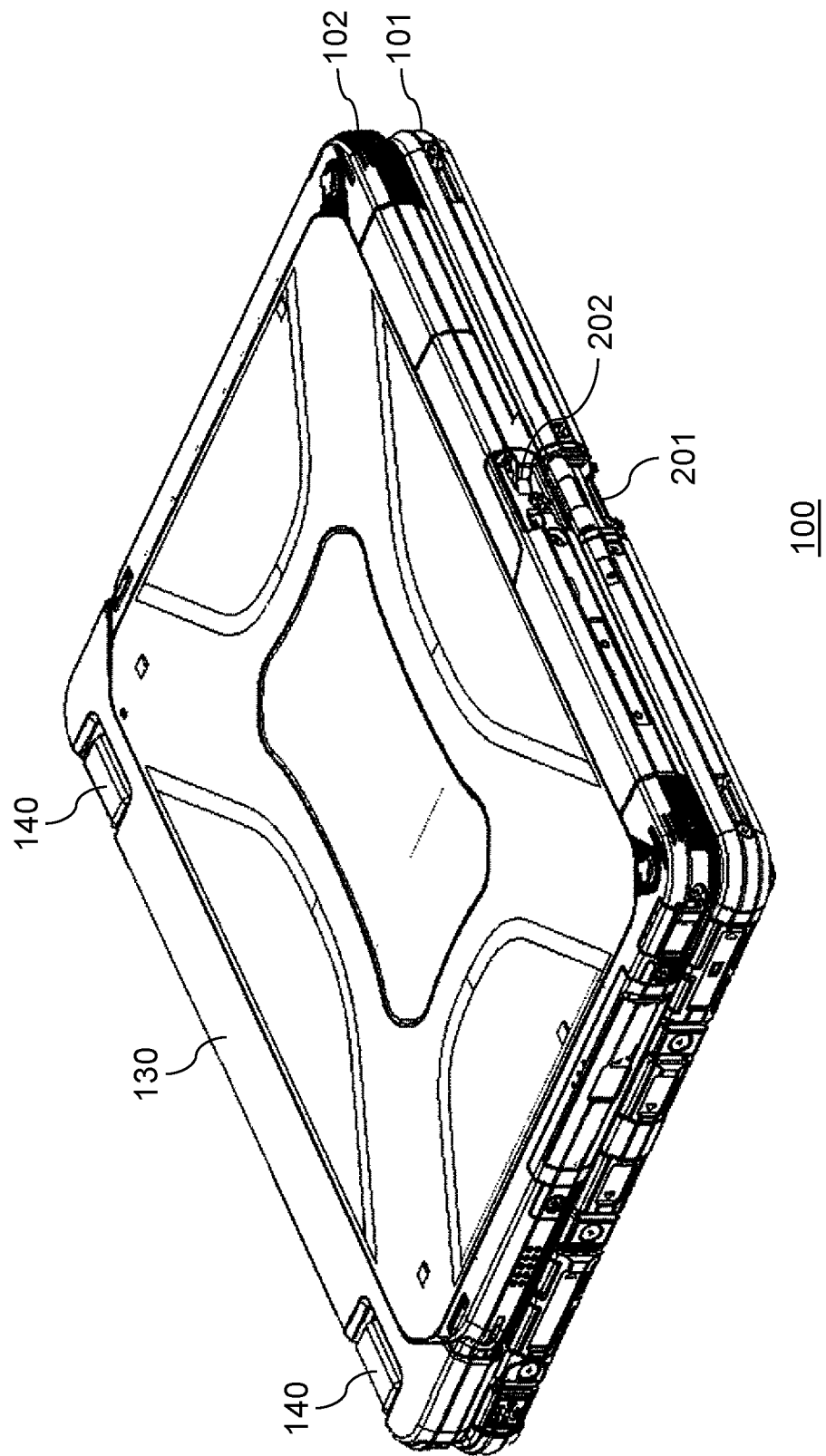
FIG. 2 is a perspective view of the information processing device in a state in which a second unit is closed with respect to a first unit.

Hereinafter, exemplary embodiments are described in detail with reference to the drawings as appropriate. However, detailed description beyond necessity may be omitted. For example, detailed description of a matter that has been already known well or overlapping description of substantially the same configuration may be omitted. This is to avoid unnecessary redundancy of the following description and to facilitate understanding by those skilled in the art.

Note that the inventors of the present disclosure provide the attached drawings and the following description for those skilled in the art to fully understand the present disclosure, and do not intend to limit the subject matter as described in the appended claims by these drawings and description.

First Exemplary Embodiment

[1-1. Entire Configuration]

FIG. 1 is a perspective view of an information processing device according to a first exemplary embodiment of the present disclosure. The information processing device serves as an example of an electronic device. It should be noted that, hereinafter, description is given by appropriately using directions shown in FIG. 1 as directions of the information processing device.

As shown in FIG. 1, information processing device 100 includes first unit 101 and second unit 102. Second unit 102 is detachable from first unit 101. In a case where second unit 102 is attached to first unit 101, information processing device 100 can be utilized as a notebook type computer. Further, second unit 102 can be utilized alone as a tablet type computer. In this way, information processing device 100 is a so-called detachable type computer.

Second unit 102 alone has a function as the tablet type computer. Second unit 102 includes display 121. Display 121 is configured, for example, with a liquid crystal display device, and is mounted on one principal surface of second casing 120. Display 121 may be configured with another display device, such as an organic EL device. Display 121 is provided with a touch panel disposed on the liquid crystal display device and capable of receiving user's touch operation. In order to realize the function as the computer, second unit 102 incorporates a central processing unit (CPU), a volatile storage (RAM), a nonvolatile storage (ROM, SSD, or the like), a battery, and the like. The nonvolatile storage (ROM, SSD, or the like) stores an operating system (OS), various application programs, various data, and the like. The central processing unit (CPU) executes arithmetic processing by reading the OS, the application programs, and the various data, thereby realizing various functions.

First unit 101 includes first casing 110, holder 130, and hinge 140. First casing 110 is formed of metal, such as magnesium alloy, or resin. First unit 101 includes an input part through which the user performs input operation on the second unit. As the input part, first casing 110 is provided with keyboard 111, touch pad 112, operation buttons 113, and the like.

Holder 130 is electrically or mechanically connected with first unit 101. Holder 130 attaches second unit 102 by housing a part of second unit 102. When second unit 102 is attached, holder 130 electrically connects first unit 101 with second unit 102.

Hinge 140 couples holder 130 (i.e., second unit 102) and first unit 101 such that holder 130 can rotate to first unit 101.

A connector (not shown) connected with a connector (not shown) of the second unit is provided within holder 130. Further, wiring for exchanging various signals or electric power between holder 130 and first unit 101 is passed through an inside of hinge 140. Various signals and electric power can be given and received between first unit 101 and second unit 102 via these connectors and wiring.

FIG. 2 is a perspective view of information processing device 100 in a state in which second unit 102 is closed with respect to first unit 101. Connection terminals for connecting a power supply plug, an external device, a memory card, and the like are provided on a side surface of first unit 101. The respective connection terminals are provided with terminal covers such that the connection terminals are not exposed when the connection terminals are not used.

In the same way as first unit 101, second unit 102 is also provided with a connection terminal for the memory card, an earphone/microphone connection terminal, an HDMI (registered trademark) terminal, a USB terminal, and the like. A waterproof and dust-proof terminal cover is provided for each of the terminals.

Further, information processing device 100 of the present exemplary embodiment includes a latch mechanism for holding a state in which second unit 102 is closed with respect to first unit 101. The latch mechanism includes latch 201 provided in first unit 101 and latch receiver 202 provided in second unit 102. Latch 201 is formed of metallic material, such as magnesium. In first unit 101, latch 201 is disposed in a center of a front side end of information processing device 100. In second unit 102, latch receiver 202 is provided in a center of a front side end of information processing device 100 when second unit 102 is closed.

[1-2. Latch Mechanism]

[1-2-1. External Configuration of Latch Mechanism]

Figure 3:
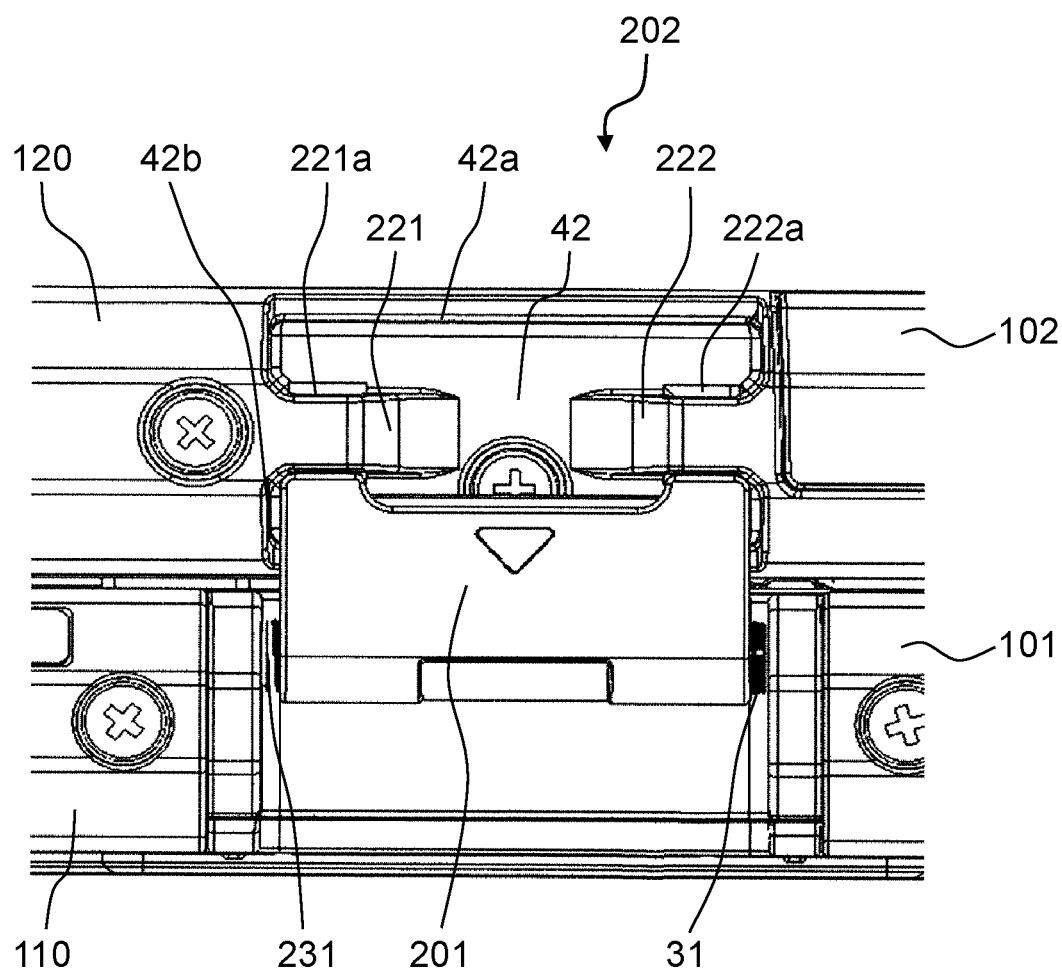
FIG. 3 is a view showing a latch mechanism of the information processing device in a state in which a latch is locked.
Figure 4:
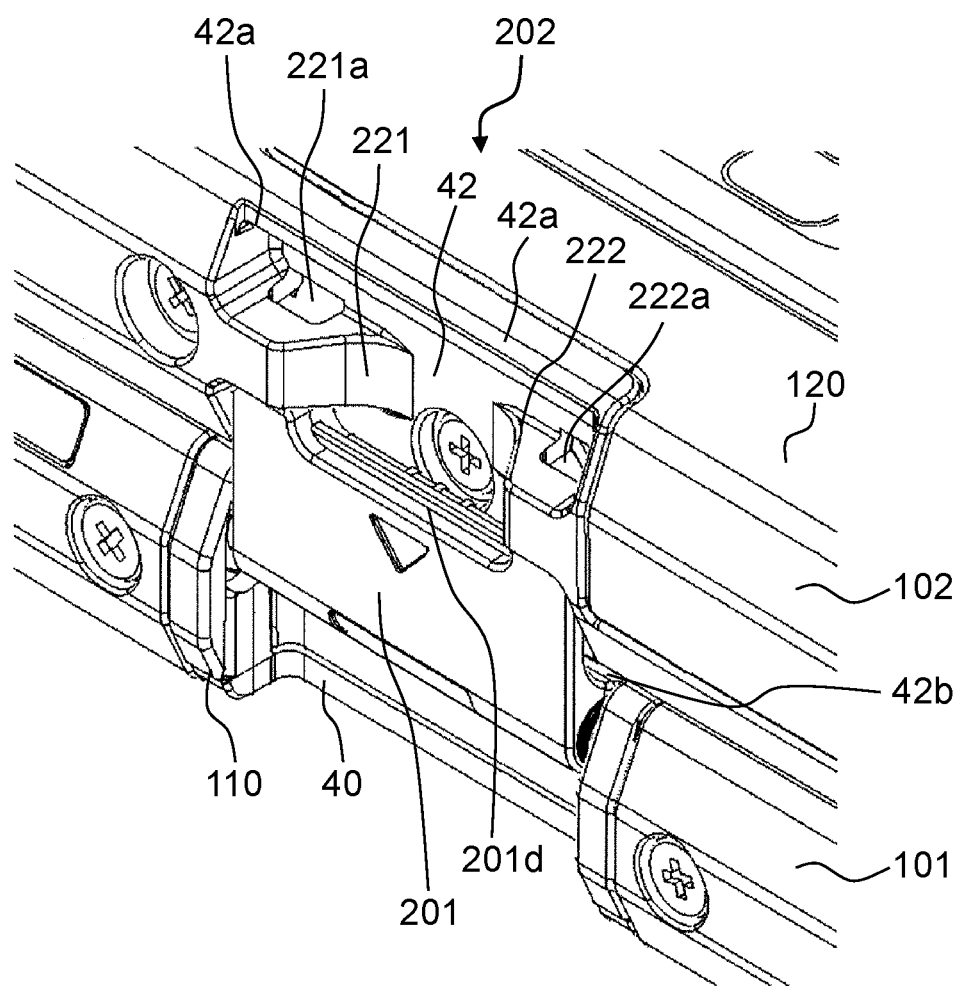
FIG. 4 is a view showing the latch mechanism of the information processing device in the state in which the latch is locked.

FIGS. 3 and 4 are views showing the latch mechanism in a state in which latch 201 is locked. FIG. 3 is a view of the latch mechanism as seen from a front of information processing device 100, and FIG. 4 is a view of the latch mechanism as seen from obliquely above information processing device 100.

Protrusions 221, 222 are provided on right and left within recess 42 provided in second casing 120. Respective protrusions 221, 222 have lock holes 221a, 222a. In FIGS. 3 and 4, lock holes 221a, 222a are provided on upper surfaces of protrusions 221, 222. Lock holes 221a, 222a are similarly provided on opposite surfaces (lower surfaces) of protrusions 221, 222. Since lock holes 221a, 222a are provided on both surfaces (a surface on which display 121 is disposed and its back surface) of second unit 102 in this way, second unit 102 can be mounted on first unit 101 in any direction. In second casing 120, wall-shaped lock parts 42a, 42b are respectively provided on an upper side and a lower side of recess 42.

Figure 5:
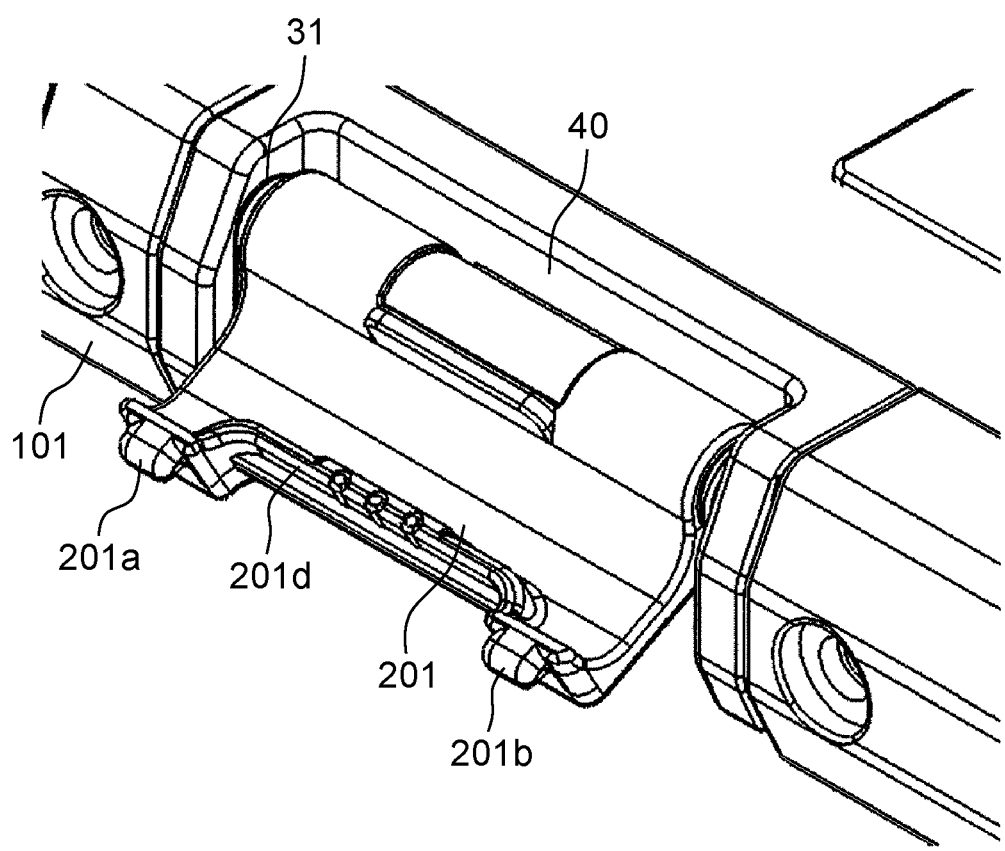
FIG. 5 is a perspective view of the latch.

FIG. 5 is a view showing a state in which latch 201 is unlocked and latch 201 is released. Latch 201 is rotatably disposed around a rotation shaft within recess 40 provided in first casing 110. In latch 201, projections 201a, 201b that project in a radial direction of rotation are formed at ends on a side farthest from the rotation shaft. Further, protrusion 201d (a lock part) that projects in a direction orthogonal to the radial direction of rotation is provided at an end on the side farthest from the rotation shaft of latch 201.

During unlocking, latch 201 is completely housed in recess 40 of first unit 101 in a state in which latch 201 is maximally opened (rotated) downward. Hereinafter, a rotational position (a rotation angle) of latch 201 when latch 201 is completely housed in recess 40 of first unit 101 in the state in which latch 201 is maximally opened (rotated) downward during unlocking is referred to as a "first rotational position" or a "housing position". Meanwhile, the rotational position (the rotation angle) of latch 201 when latch 201 is locked is referred to as a "second rotational position" or a "lock position". In the present exemplary embodiment, when the first rotational position is set at 0 degrees, the second rotational position becomes 180 degrees.

[1-2-2. Lock Operation of Latch Mechanism]

Lock operation of latch 201 is described with reference to FIGS. 6A to 6C. FIG. 6A shows a state in which latch 201 is located at the first rotational position, that is, a state in which latch 201 is unlocked, while second unit 102 is closed to first unit 101. In order to lock latch 201 from this state, first, latch 201 is rotated until projections 201a, 201b at tips abut on protrusions 221, 222 of second unit 102. In a state in which projections 201a, 201b of latch 201 first abut on protrusions 221, 222 of second unit 102, latch 201 is further pressed into second unit 102 side. Then, projections 201a, 201b approach lock holes 221a, 222a while sliding on surfaces of protrusions 221, 222 (see FIG. 6B). At this time, the rotation shaft of latch 201 is biased upward by a biasing part (details are described below). Eventually, when projections 201a, 201b reach lock holes 221a, 222a of protrusions 221, 222, projections 201a, 201b are inserted in lock holes 221a, 222a by the biasing part (see FIG. 6C). Accordingly, latch 201 is locked. The rotational position of latch 201 at this time is the second rotational position (the lock position).

Since projections 201a, 201b of latch 201 are inserted in lock holes 221a, 222a of second unit 102 in a lock state, rotation of latch 201 is regulated. In this state (see FIG. 6C), lock part 42b on the lower side of second unit 102 is located below protrusion 201d of latch 201 (in other words, lock part 42b is located between protrusion 201d and the rotation shaft of latch 201). In order to open second unit 102 in this state, it is necessary that protrusion 201b is moved such that lock part 42b of second unit 102 is not regulated by protrusion 201d of latch 201. However, since the rotation of latch 201 is regulated in the lock state, protrusion 201d of latch 201 cannot be moved. As a result, second unit 102 cannot be opened, and second unit 102 is held in a closed state.

Unlock operation of latch 201 is described with reference to FIGS. 7A to 7C. FIG. 7A is a view showing the lock state of latch 201. Latch 201 is moved downward against biasing force of the biasing part (described below) in this state (see FIG. 7B), and projections 201a, 201b are escaped from lock holes 221a, 222a. When projections 201a, 201b are escaped from lock holes 221a, 222a, latch 201 is rotated (opened) downward by its own weight (see FIG. 7C). With this configuration, protrusion 201d of latch 201 is moved, and movement of lock part 42b of second unit 102 is no longer prevented. Accordingly, second unit 102 can be opened. In other words, latch 201 is unlocked. As described above, the latch mechanism of the present exemplary embodiment can realize locking and unlocking of the latch by simple operation.

[1-2-3. Lock Mechanism]

Description is given of an internal configuration of the latch mechanism for realizing the lock operation and the unlock operation of latch 201 described above.

Figure 8:
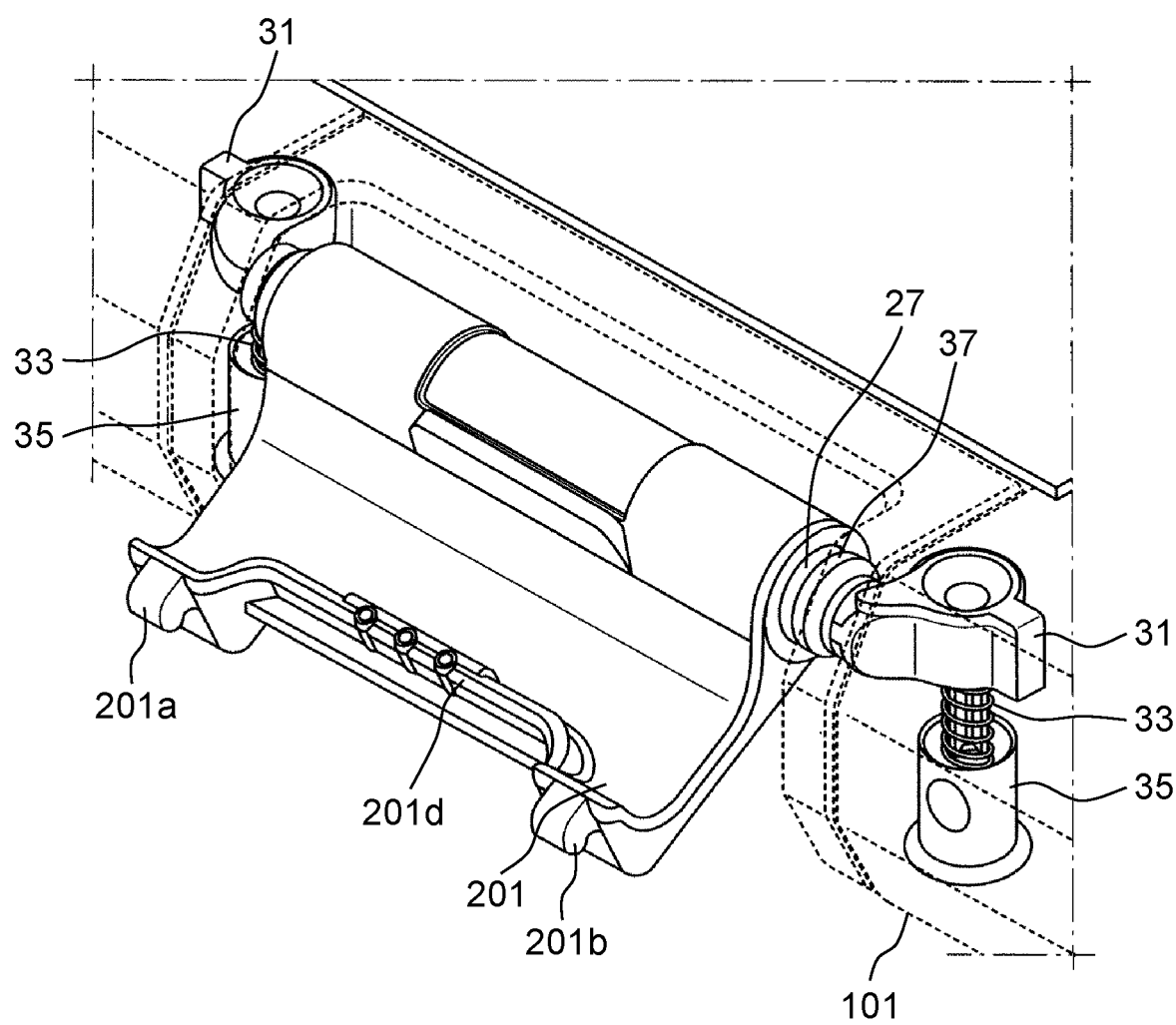
FIG. 8 is a view showing an internal configuration of the latch mechanism.
Figure 9:
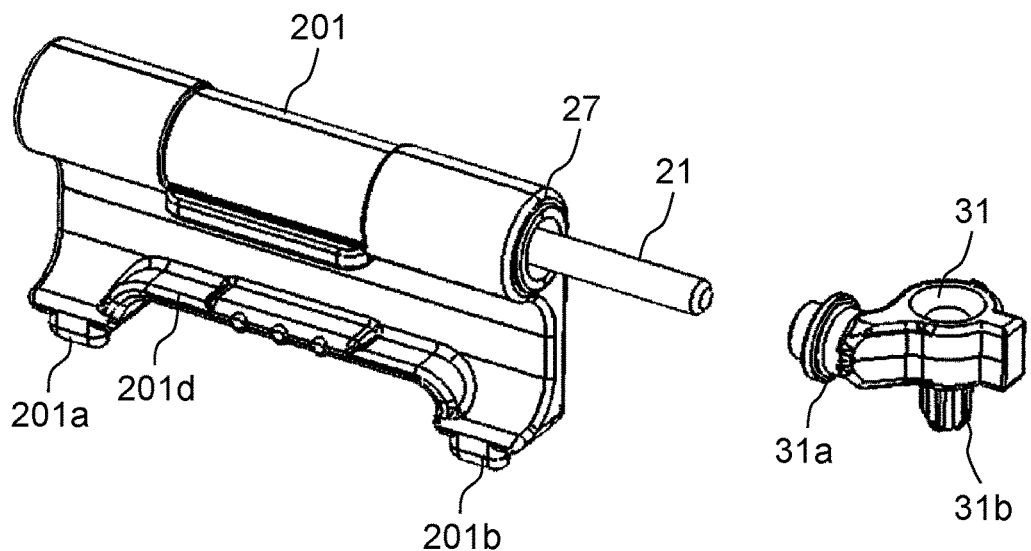
FIG. 9 is a view explaining the latch, a shaft, and a rotation shaft supporting part.
Figure 10:
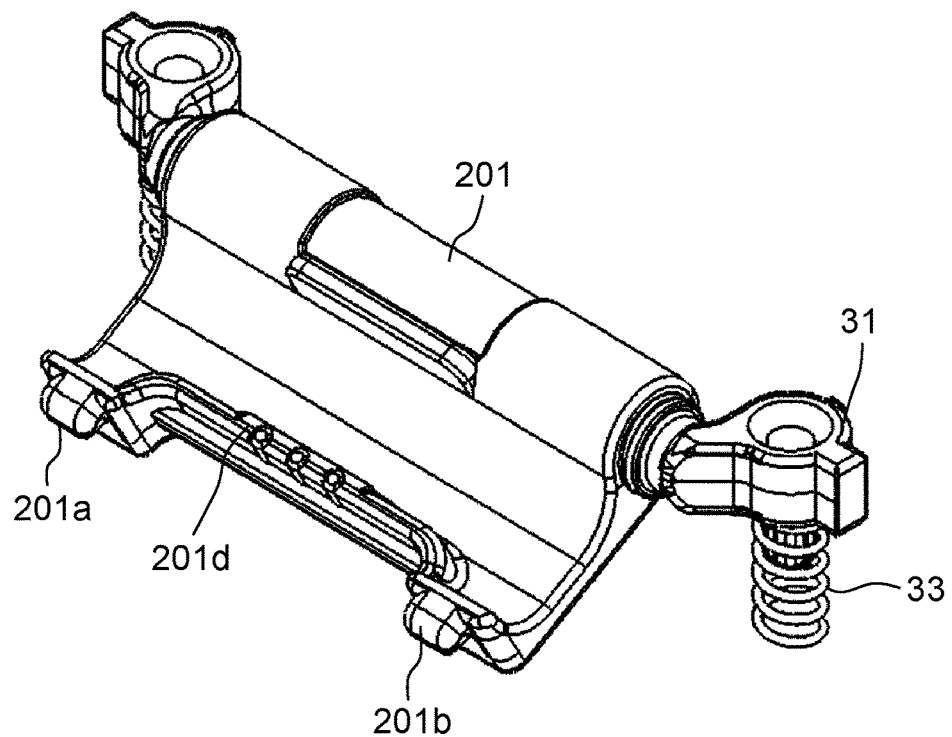
FIG. 10 is a view explaining the latch, the rotation shaft supporting part, and a spring (a biasing member)
Figure 11:
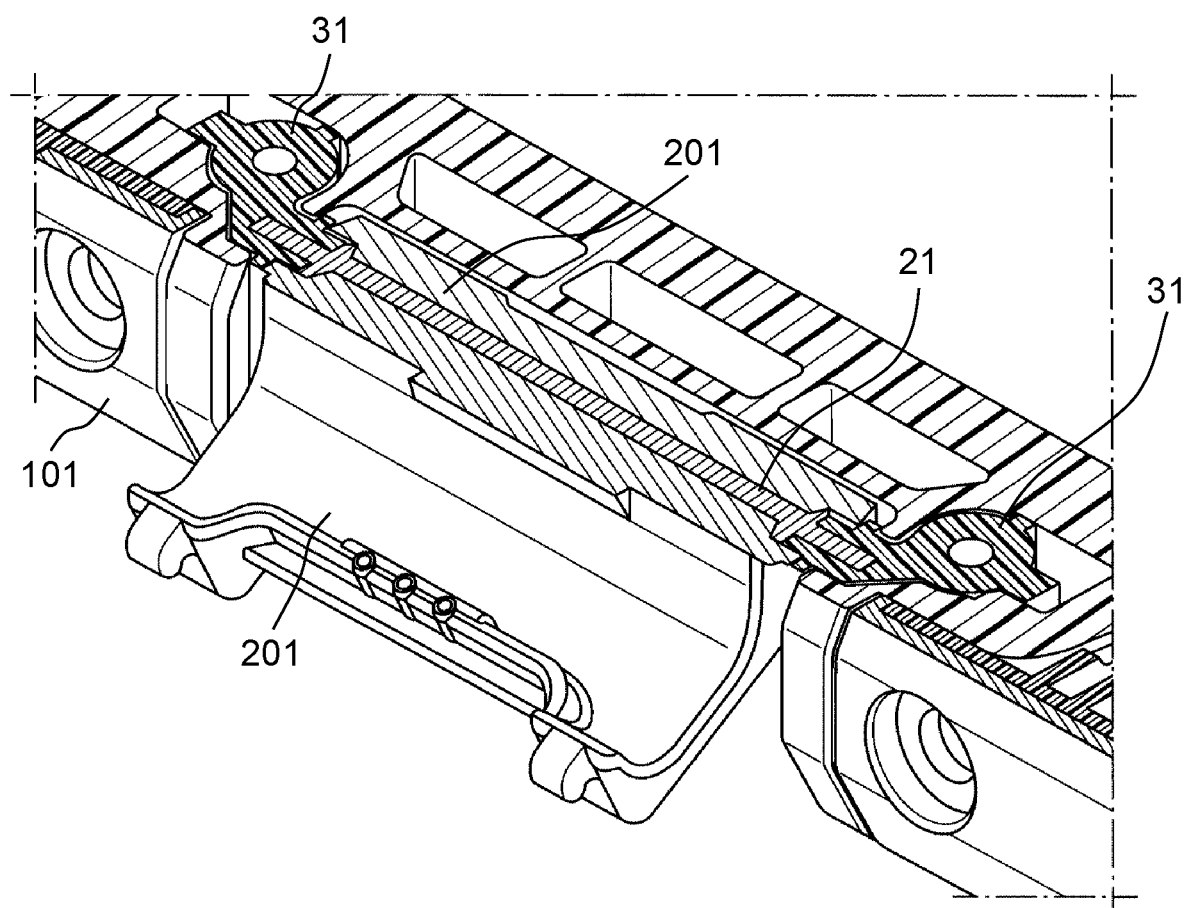
FIG. 11 is a sectional view (a horizontal sectional view) for explaining the configuration of the latch mechanism.
Figure 12:
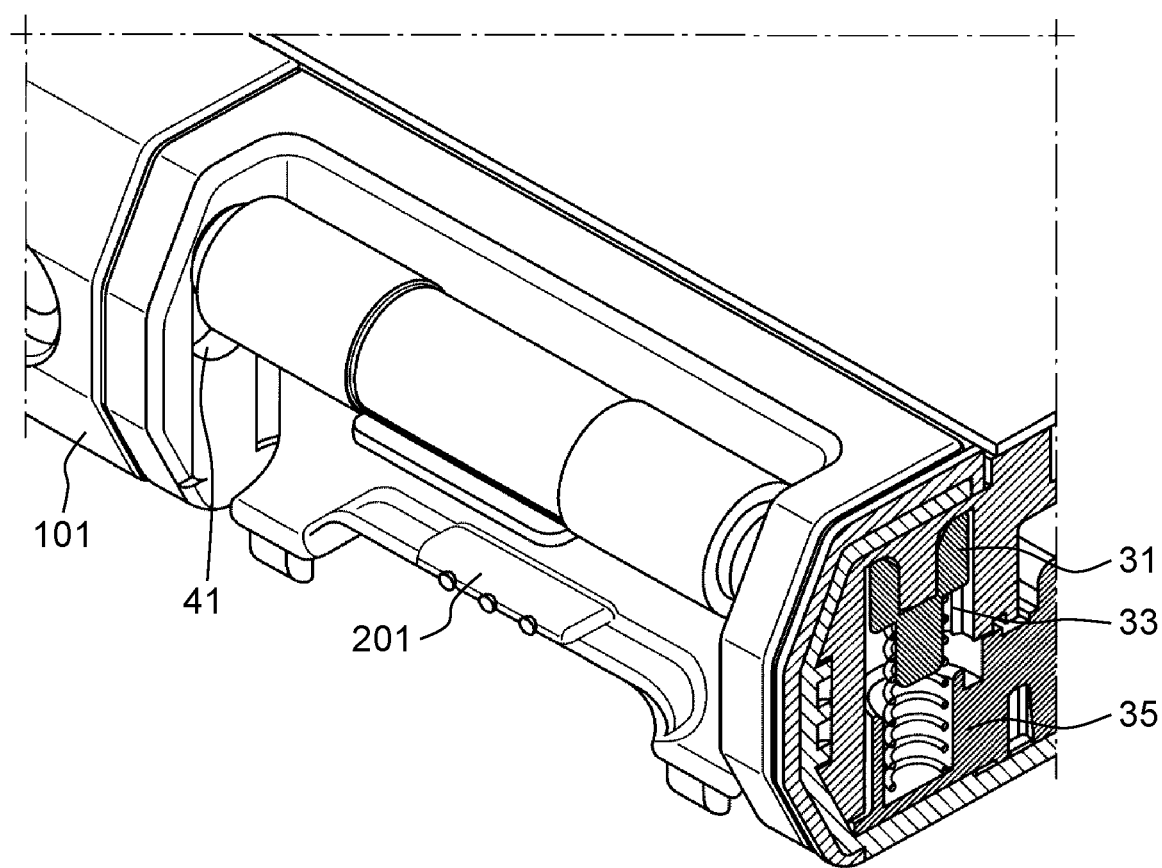
FIG. 12 is a sectional view (a vertical sectional view) for explaining the configuration of the latch mechanism.

FIG. 8 is a view showing the internal configuration of the latch mechanism. FIGS. 9 and 10 are views explaining components around latch 201. FIG. 11 is a sectional view (a horizontal sectional view) for explaining the components for realizing the rotation of latch 201. FIG. 12 is a sectional view (a vertical sectional view) for explaining the components for realizing movement of latch 201 in an up and down direction.

As shown in FIG. 8, in first unit 101, rotation shaft supporting part 31, spring 33 (one example of the biasing part), and spring supporting part 35 are disposed on both sides of latch 201. Rotation shaft supporting part 31 is formed of, for example, resin. As shown in FIGS. 9 and 11, shaft 21 passes through an inside of latch 201, and is supported by rotation shaft supporting parts 31 at both ends of latch 201. With this configuration, latch 201 can rotate shaft 21 as the rotation shaft. It should be noted that a caliber of a through-hole for shaft 21 in latch 201 is set at a value larger than a diameter of shaft 21 such that friction of shaft 21 serving as the rotation shaft is reduced. Accordingly, latch 201 is opened (rotated) downward by its own weight in a state in which latch 201 is not locked.

As shown in FIG. 9, rotation shaft supporting part 31 has shaft holding part 31a and spring mounting part 31b. Shaft holding part 31a holds shaft 21. As shown in FIGS. 10 and 12, spring mounting part 31b is mounted with spring 33 for biasing rotation shaft supporting part 31 in a predetermined direction (a direction from spring 33 to rotation shaft supporting part 31). Spring 33 is held by spring supporting part 35 formed in first casing 110.

As described below, rotation shaft supporting part 31 is movable in the predetermined direction or a direction opposite to the predetermined direction. Hereinafter, regarding positions of rotation shaft supporting part 31, a position at which rotation shaft supporting part 31 is farthest from latch receiver 202 of second unit 102 in a state in which second unit 102 is closed is referred to as a "first position". Meanwhile, a position at which rotation shaft supporting part 31 can take in a state in which latch 201 is locked is referred to as a "second position". In other words, latch 201 is rotatable at least from the first rotational position to the second rotational position, and rotation shaft supporting part 31 is movable at least from the first position to the second position.

Figure 13:
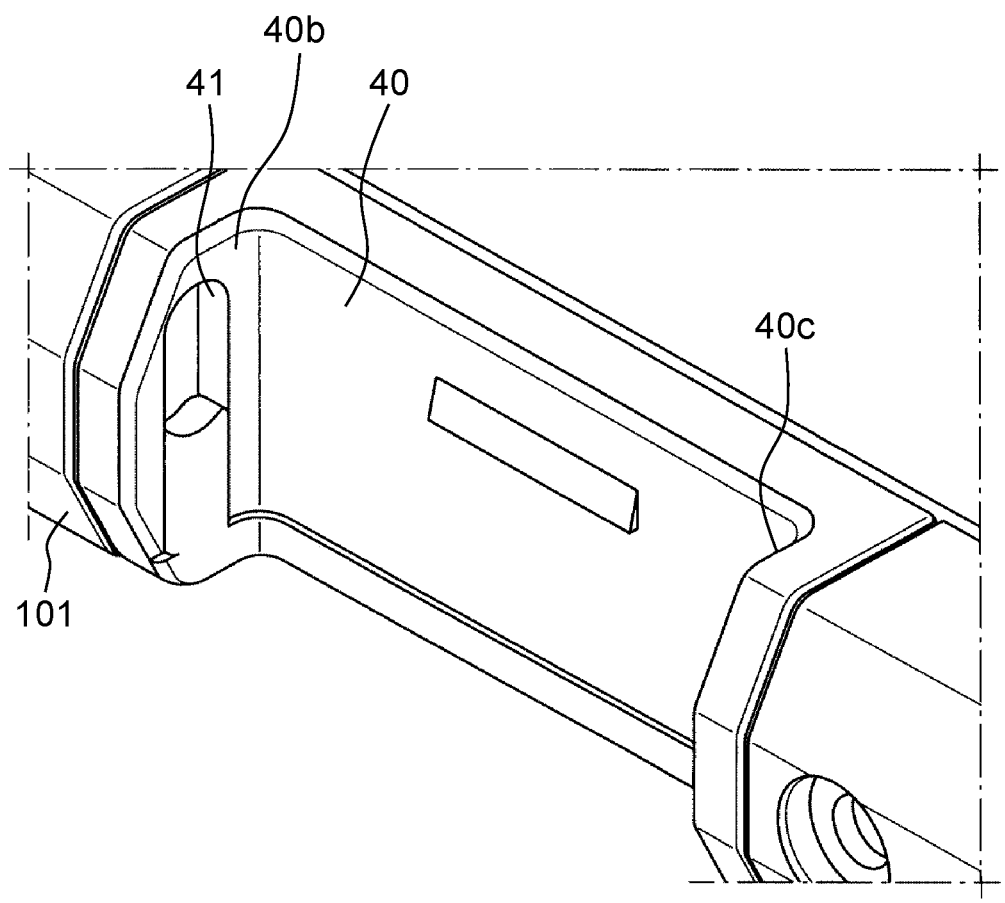
FIG. 13 is a view explaining a recess that houses the latch in the first unit.
Figure 14:
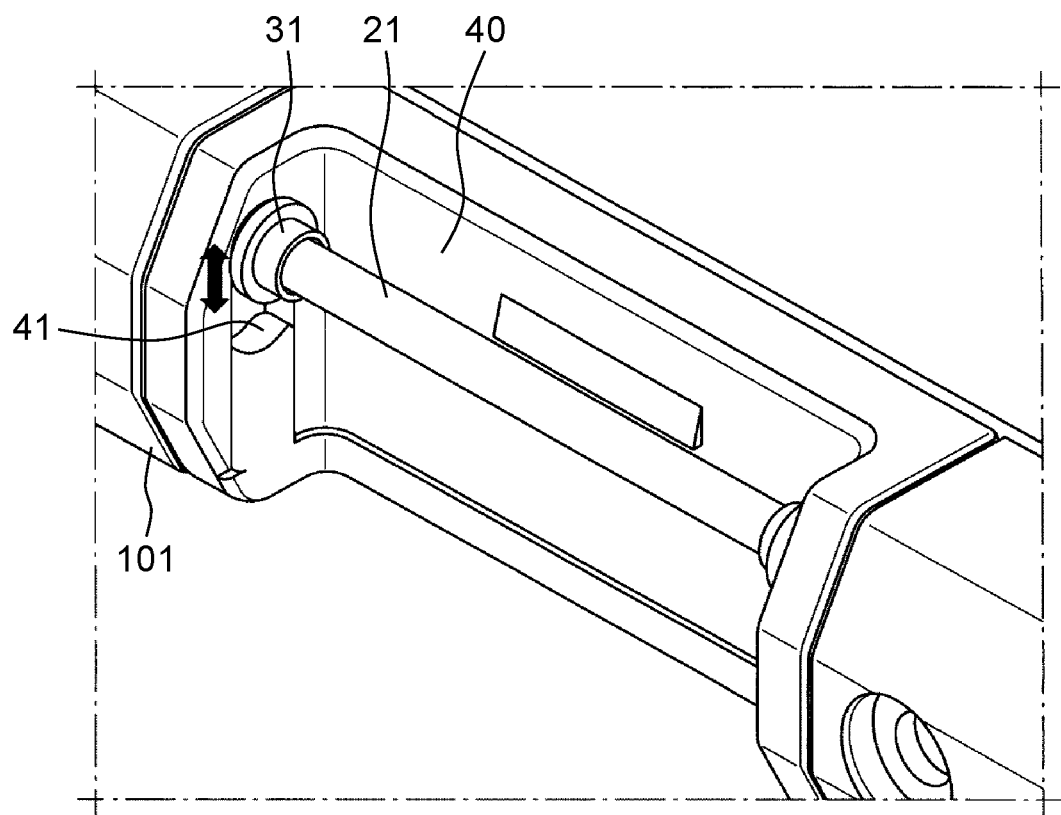
FIG. 14 is a view explaining a connection state between the shaft and the rotation shaft supporting part in the first unit.

FIG. 13 is a view explaining recess 40 that houses latch 201 in first unit 101. Groove 41 formed in the up and down direction is provided on walls 40b, 40c located on right and left sides of recess 40. FIG. 14 is a view explaining rotation shaft supporting part 31 inserted in grooves 41 and shaft 21 connected to rotation shaft supporting part 31. Rotation shaft supporting part 31 can move within grooves 41 upward or downward according to the biasing force of spring 33 or force that presses down latch 201. It should be noted that the biasing force of spring 33 must be a force capable of moving rotation shaft supporting part 31 to the second position, in such a manner that projections 201a, 201b of latch 201 can be inserted in lock holes 221a, 222a of second unit 102 in the state in which latch 201 is locked.

Figure 15:
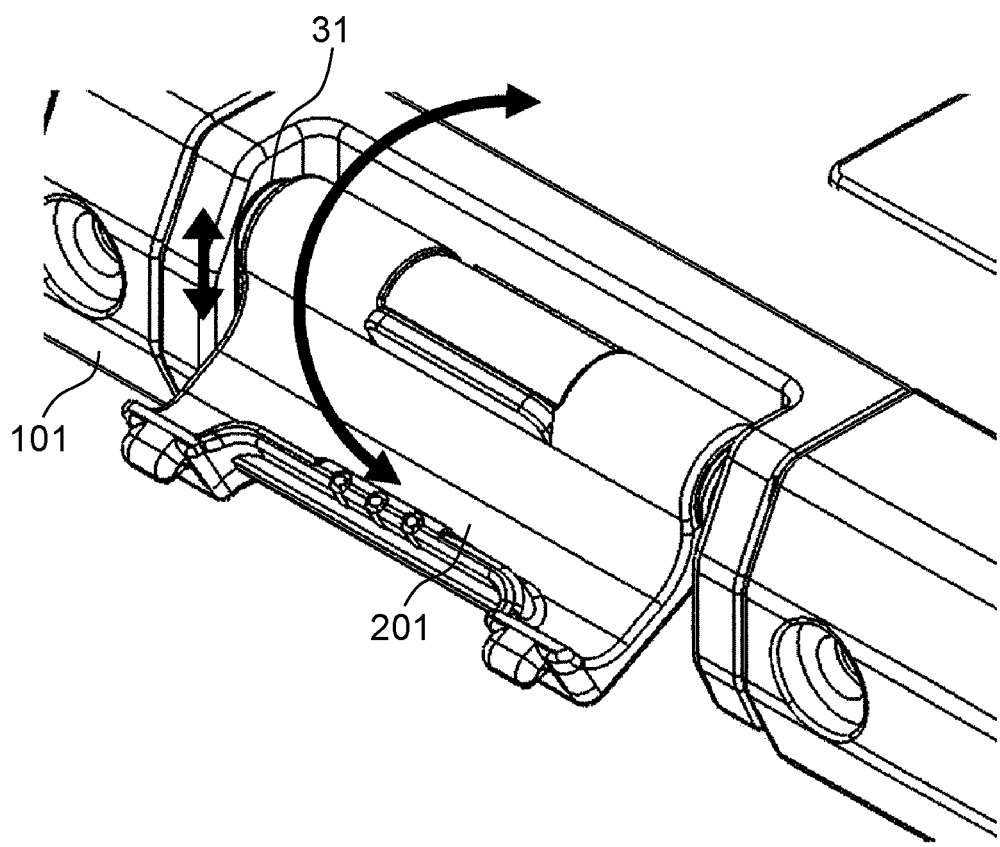
FIG. 15 is a view for explaining operation of the latch.

By configuring the latch mechanism as described above, as shown in FIG. 15, latch 201 can be rotated around the rotation shaft (shaft 21), and the rotation shaft can be moved upward and downward. Due to the rotation of latch 201 and the up and down movement, it is possible to realize the lock operation and the unlock operation of latch 201 by the simple operation explained in FIGS. 6A to 6C, 7A to 7C. As the latch mechanism, only latch 201 is sufficient for a part provided outside of a main body. The latch mechanism has a simple configuration, and does not require a large space. As a result, the latch mechanism shown in the present exemplary embodiment can be also mounted on a thin device.

[1-2-4. Rotation Suppressing Structure]

A rotation suppressing structure of latch 201 is described with reference to FIGS. 16 to 19. As mentioned above, when latch 201 is not in the lock state, latch 201 can be freely rotated with shaft 21 as the rotation shaft. As a result, in a case where information processing device 100 is used in an environment with much vibration, such as within a moving vehicle, latch 201 is vibrated and noise occurs. In the present exemplary embodiment, in order to prevent vibration and noise, the rotation suppressing structure is devised such that latch 201 is not vibrated when latch 201 is unlocked.

Figure 16:
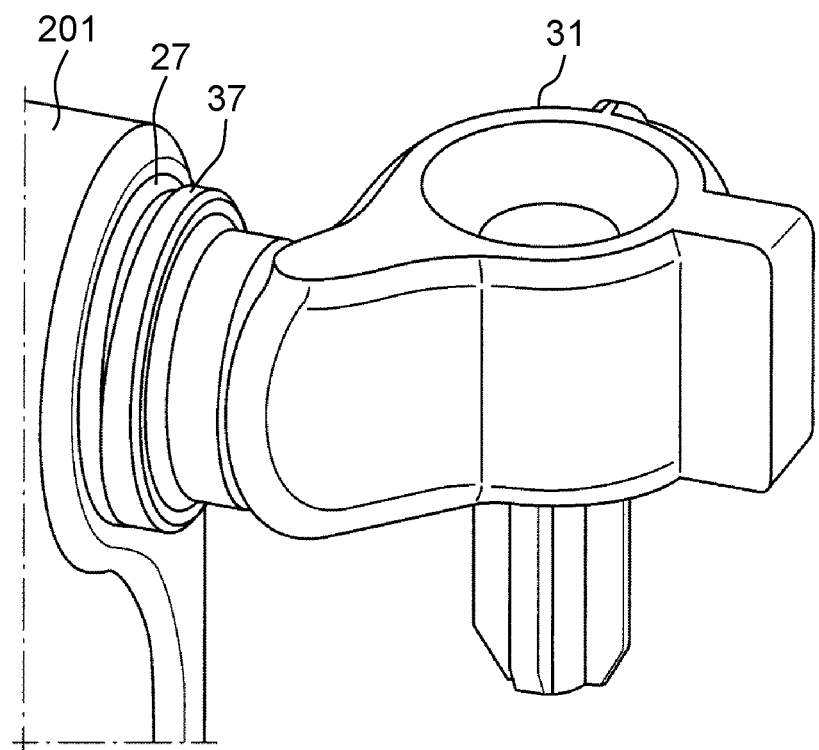
FIG. 16 is a view for explaining ring-shaped parts, that regulate rotation of the latch, respectively provided in the latch and the rotation shaft supporting part (a shaft holding part)

FIG. 16 is a view for explaining a configuration for suppressing rotation of latch 201. In order to suppress the rotation of latch 201, latch 201 is provided with ring-shaped part 27 disposed coaxially with shaft 21. Further, shaft holding part 31a of rotation shaft supporting part 31 is provided with ring-shaped part 37 disposed coaxially with shaft 21.

Figure 17:
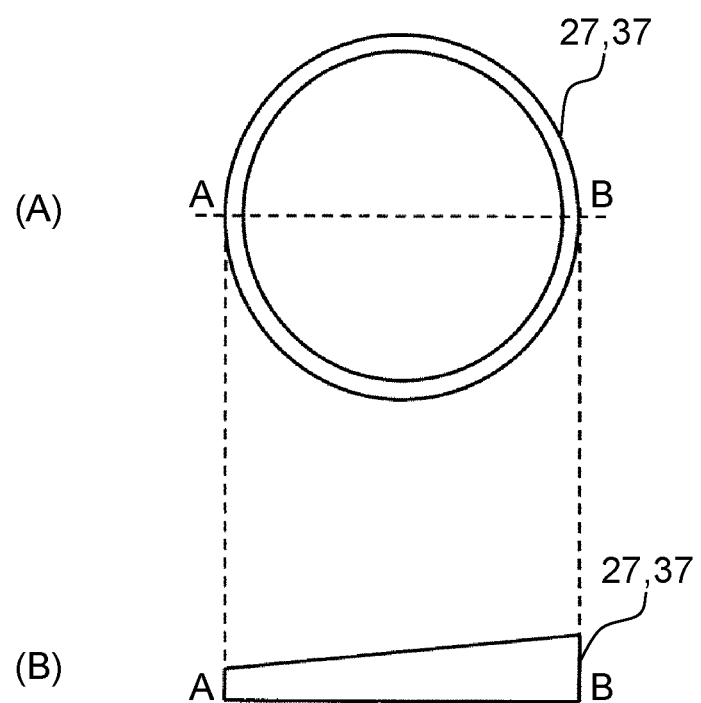
FIG. 17 is a view explaining structural characteristics of the ring-shaped parts.

FIG. 17 is a view explaining structural characteristics of ring-shaped parts 27, 37. In FIG. 17, (A) is an upper view of ring-shaped parts 27, 37, and (B) is a side view of ring-shaped parts 27, 37. For example, as shown in (B) of FIG. 17, ring-shaped parts 27, 37 are formed such that heights are continuously changed (that is, so as to have gradients) in a height direction. Specifically, ring-shaped parts 27, 37 are formed such that ring-shaped parts 27, 37 become highest at position B and become lowest at position A symmetric to position B with a center of rings as a reference.

Figure 18:
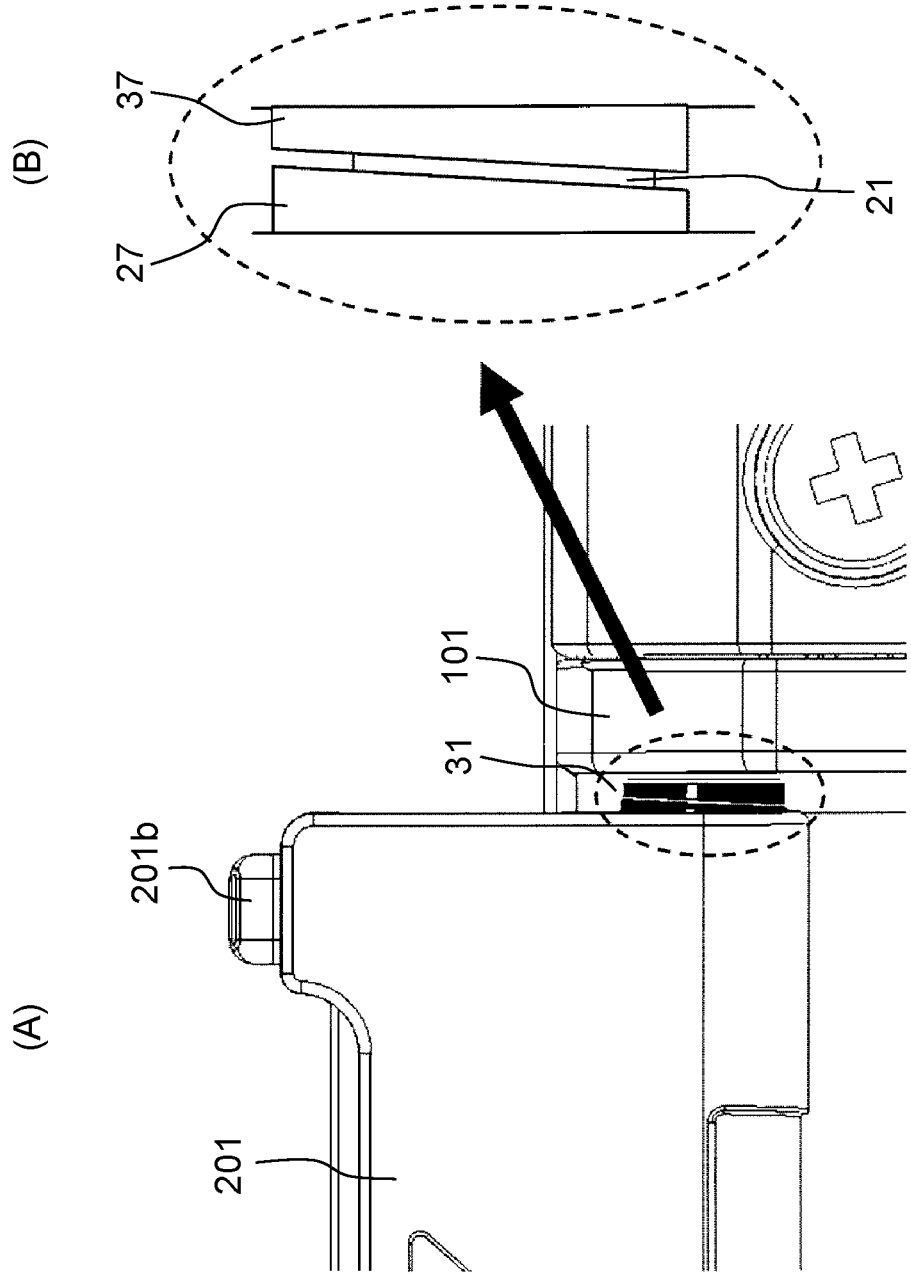
FIG. 18 is a view explaining states of two ring-shaped parts when the latch is in a closed state.
Figure 19:
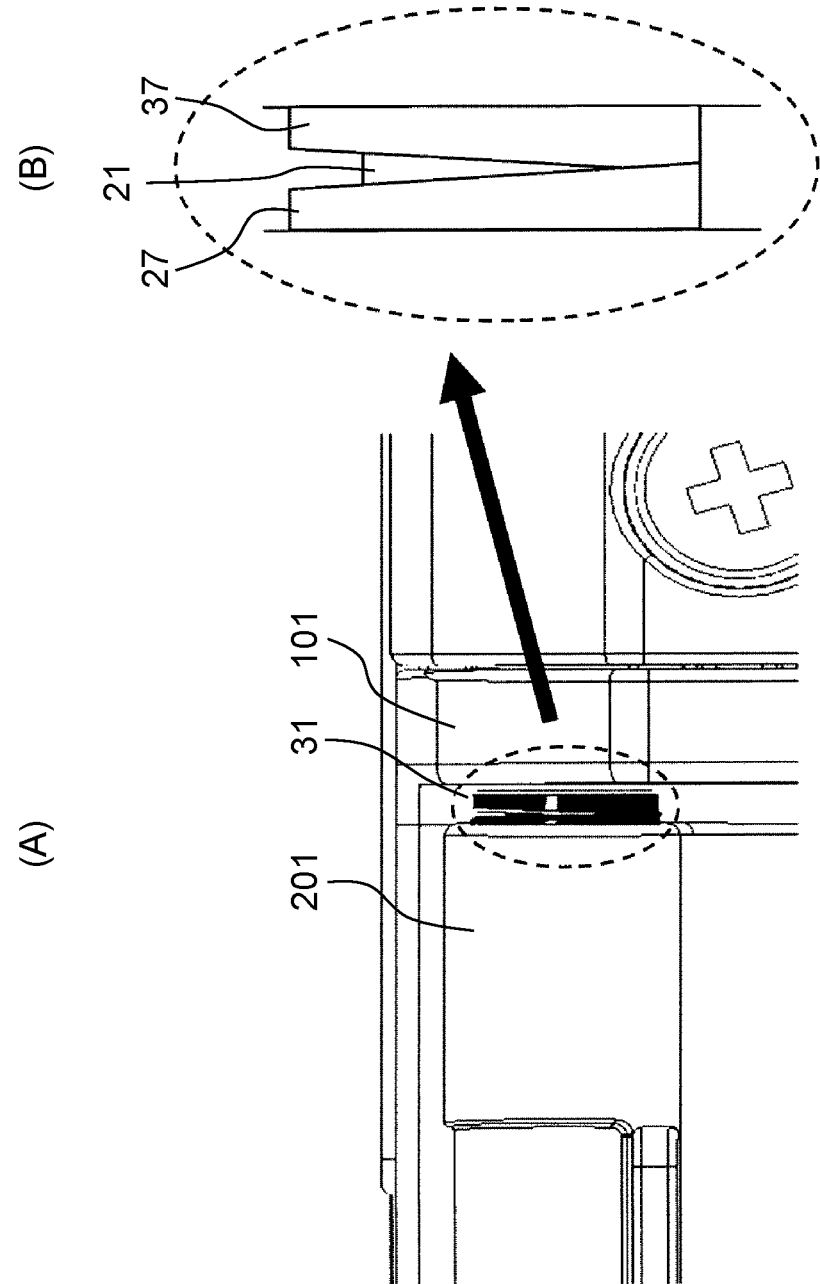
FIG. 19 is a view explaining states of the two ring-shaped parts when the latch is in an opened state.

FIG. 18 is a view explaining states of ring-shaped part 27 in latch 201 and ring-shaped part 37 in rotation shaft supporting part 31 when latch 201 is located at the second rotational position (the lock position). FIG. 19 is a view explaining states of two ring-shaped parts 27, 37 when latch 201 is located at the first rotational position (the housing position). As shown in FIGS. 18 and 19, the heights of ring-shaped part 27 of the latch and ring-shaped part 37 of the rotation shaft supporting part are set such that an area of abutment between ring-shaped part 27 and ring-shaped part 37 increases as latch 201 rotates from the second rotational position (the lock position) to the first rotational position (the housing position).

Specifically, as shown in FIG. 18, respective ring-shaped parts 27, 37 are formed such that, when latch 201 is located at the second rotational position (the lock position), a high portion of ring-shaped part 27 opposes a low portion of ring-shaped part 37 of rotation shaft supporting part 31, and a low portion of ring-shaped part 27 opposes a high portion of ring-shaped part 37. At this time, as shown in (B) of FIG. 18, a gap is formed between ring-shaped part 27 of latch 201 and ring-shaped part 37 of rotation shaft supporting part 31. Accordingly, latch 201 can rotate without being blocked by ring-shaped parts 27, 37.

Since ring-shaped parts 27, 37 are formed as described above, when latch 201 is rotated to the first rotational position (the housing position), the high portion of ring-shaped part 27 and the high portion of ring-shaped part 37 of rotation shaft supporting part 31 oppose to each other (see FIG. 19). At this time, as shown in (B) of FIG. 19, the high portion of ring-shaped part 27 of latch 201 and the high portion of ring-shaped part 37 of rotation shaft supporting part 31 abut on (interfere with) each other. Because of friction caused by this abutment (interference), the rotation of latch 201 is suppressed, and latch 201 is fixed at the first rotational position (the housing position).

By above-described ring-shaped parts 27, 37, when the latch is locked, latch 201 can be freely rotated. On the other hand, when the latch is unlocked, latch 201 can be fixed at the housing position, and vibration of the latch can be suppressed. In other words, the vibration of latch 201 can be reduced without using a cushion or spring dedicated to vibration prevention, and occurrence of noise caused by the vibration can be suppressed. Accordingly, the configuration can be simplified, and miniaturization can be realized.

It should be noted that shapes of ring-shaped parts 27, 37 are not limited to the structure shown in FIG. 17. Ring-shaped parts 27, 37 may have a structure having a comparatively high portion and a comparatively low portion. Moreover, the shapes (the heights) of ring-shaped parts 27, 37 may be adjusted as follows. In other words, when latch 201 is located at or near the second rotational position (the lock position), a comparatively high portion (or a comparatively low portion) of ring-shaped part 27 of latch 201 and a comparatively low portion (or a comparatively high portion) of ring-shaped part 37 of rotation shaft supporting part 31 oppose to each other. Also, when latch 201 is located at the first rotational position (the housing position), the comparatively high portions of ring-shaped parts 27, 37 oppose to and abut on each other.

Figure 20A:
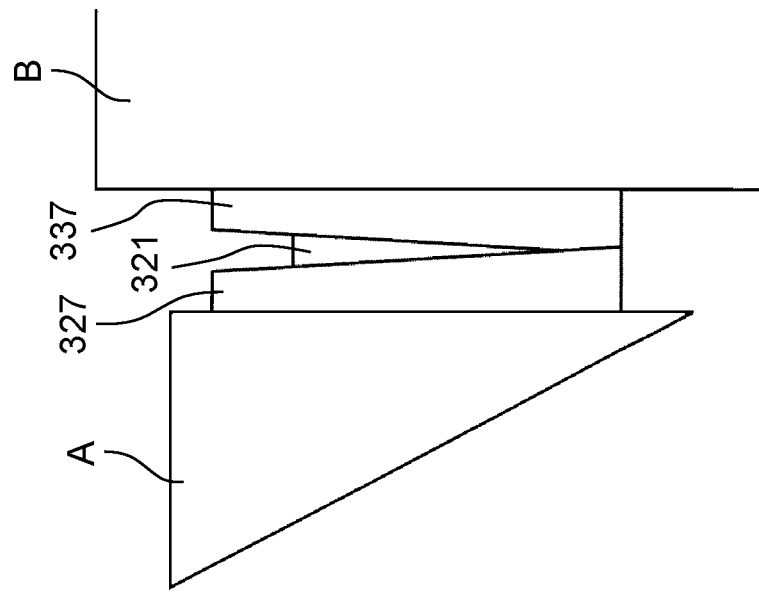
FIGS. 20A and 20B are views explaining a general application of ring-shaped parts that suppress rotation.
Figure 20B:
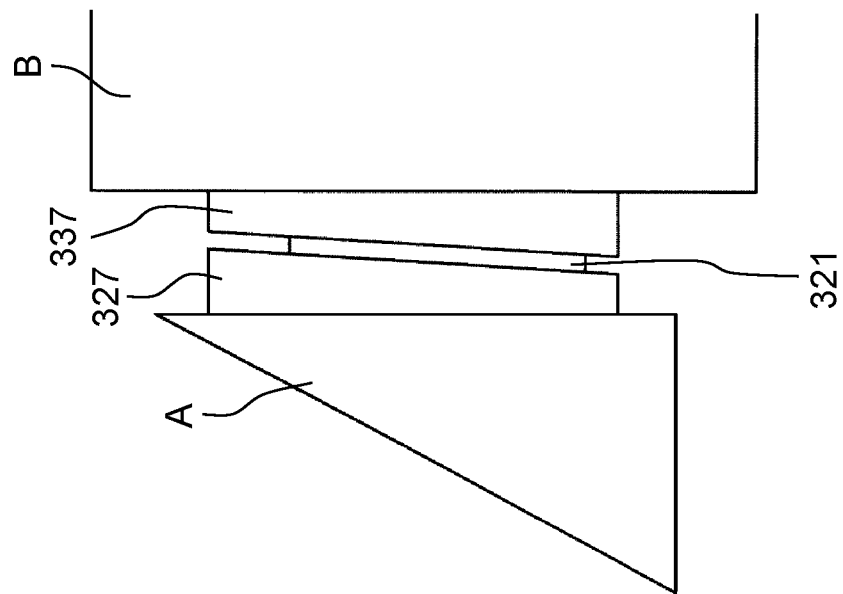

Further, the aforementioned ring-shaped rotation suppressing structure can be applied not only to the latch mechanism but also to other rotation mechanisms. In other words, as shown in FIGS. 20A and 20B, in a case where member A is rotatably coupled to member B, ring-shaped parts 327, 337 may be respectively formed in member A and member B. Ring-shaped parts 327, 337 are disposed coaxially with rotation shaft 321, and are changed so as to have gradients in a height direction. In this case, as shown in FIG. 20B, heights of ring-shaped parts 327, 337 may be adjusted such that comparatively high portions of ring-shaped parts 327, 337 oppose to each other at a rotational position where rotation is desired to be suppressed.

[1-3. Effects Etc.]

As described above, information processing device 100 of the present exemplary embodiment is the electronic device including first unit 101 and second unit 102 openable to first unit 101. Information processing device 100 includes latch mechanism (202, 201) that fixes second unit 102 in the closed state with respect to first unit 101. The latch mechanism includes latch 201, rotation shaft supporting part 31, spring 33 (one example of the biasing part), and lock holes 221a, 222a (one example of a second engagement part). Latch 201 is provided in first unit 101, is provided with projections 201a, 201b (one example of a first engagement part) at tips, and is rotatable around shaft 21 (one example of the rotation shaft) from the first rotational position to the second rotational position. Rotation shaft supporting part 31 is provided in first unit 101, rotatably supports shaft 21, and is movable between the first position and the second position. Spring 33 is provided in first unit 101, and biases rotation shaft supporting part 31 in a direction from the first position to the second position. Lock holes 221a, 222a are provided in second unit 102, and are engageable with projections 201a, 201b. Projections 201a, 201b and lock holes 221a, 222a are engaged with each other when second unit 102 is in the closed state with respect to first unit 101, rotation shaft supporting part 31 is at the second position, and latch 201 is at the second rotational position.

Due to the above-described latch mechanism, it is possible to lock/unlock the latch by the simple operation of rotation and up and down movement. Further, since a number of parts provided outside of the main body can be reduced, the latch mechanism can be applied to a thin electronic device.

In information processing device 100, latch 201 may include protrusion 201d (one example of a first lock part), and second unit 102 (second casing 120) may include lock part 42b (one example of a second lock part). Lock part 42b is located between protrusion 201d and the rotation shaft (shaft 21) when second unit 102 is in the closed state with respect to first unit 101 and latch 201 is located at the second rotational position (that is, in the lock state). By a positional relation between protrusion 201d and lock part 42b, when latch 201 is locked, second unit 102 is prevented from being opened with respect to first unit 101.

Further, another aspect of the latch mechanism mounted on information processing device 100 of the present exemplary embodiment includes latch 201 and rotation shaft supporting part 31. Latch 201 is rotatable around the rotation shaft (shaft 21) between the housing position and the lock position, and fixes first unit 101 and second unit 102 in the closed state at the lock position. Rotation shaft supporting part 31 rotatably supports the rotation shaft. Latch 201 has first ring-shaped part 27 disposed coaxially with the rotation shaft. Rotation shaft supporting part 31 has second ring-shaped part 37 disposed coaxially with the rotation shaft (shaft 21). Heights of the first ring-shaped part and the second ring-shaped part are set such that an area of abutment between first ring-shaped part 27 and second ring-shaped part 37 increases as the latch rotates from the lock position to the housing position.

By the above-described ring-shaped parts, latch 201 can be fixed during unlocking, and vibration of the latch can be suppressed. In other words, the vibration of latch 201 can be reduced without using a cushion or spring dedicated to vibration prevention, and occurrence of noise caused by the vibration can be suppressed. Accordingly, the configuration can be simplified, and miniaturization can be realized.

Other Exemplary Embodiments

As above, the first exemplary embodiment is described as an illustration of a technique disclosed in the present application. However, the technique in the present disclosure is not limited to this first exemplary embodiment, and is also applicable to exemplary embodiments that are appropriately changed, replaced, added, omitted, or the like. Further, a new exemplary embodiment can be implemented by combining the respective components explained in the above-described first exemplary embodiment. Therefore, other exemplary embodiments are described below.

In the first exemplary embodiment, latch 201 is provided on first unit 101 side having the input part. However, latch 201 may be provided on second unit 102 side having the display.

In the first exemplary embodiment, the coil-shaped spring is used as the part for biasing rotation shaft supporting part 31. However, the biasing part is not limited to the coil-shaped spring. For example, a spring, such as a torsion spring or a plate spring, or an elastic member other than the spring may be used as the biasing part.

The shape of the projection, the protrusion, the lock part, the lock hole, or the like shown in the first exemplary embodiment is one example, and is not limited to the aforementioned shape. The shape of the projection, the protrusion, or the like may be any other shape if an identical function is realized.

In the first exemplary embodiment, the so-called detachable type computer is described as an example of the electronic device. However, the idea of the present disclosure can be applied to other kinds of electronic devices. For example, the idea of the present disclosure can be applied to an electronic device including an openable unit, such as a notebook type personal computer, a word processor, or an electronic dictionary.

As above, the exemplary embodiments are described as the illustration of the technique in the present disclosure. For that purpose, the attached drawings and the detailed description are provided.

Therefore, the components mentioned in the attached drawings and the detailed description may include not only components that are essential for solving the problems, but also components that are not essential for solving the problems to illustrate the above-described technique. Accordingly, those nonessential components should not be immediately recognized as essential just because those nonessential components are mentioned in the attached drawings or the detailed description.

Further, since the aforementioned exemplary embodiments illustrate the technique in the present disclosure, various changes, replacements, additions, omissions, or the like can be made in the claims and their equivalents.

The present disclosure is useful for an electronic device including an openable unit, such as a notebook type personal computer, a word processor, or an electronic dictionary.

What is claimed is:

1. An electronic device including a first unit and a second unit openable to the first unit, the electronic device comprising:
    a latch mechanism that fixes the second unit in a closed state with respect to the first unit,
    wherein
    the latch mechanism includes:
        a latch rotatable around a rotation shaft between a housing position and a lock position, the latch fixing the first unit and the second unit in the closed state at the lock position; and
        a rotation shaft supporting part that rotatably supports the rotation shaft, and
    the latch has a first ring-shaped part disposed coaxially with the rotation shaft,
    the rotation shaft supporting part has a second ring-shaped part disposed coaxially with the rotation shaft, and
    heights of the first ring-shaped part and the second ring-shaped part are set such that an area of abutment between the first ring-shaped part and the second ring-shaped part increases as the latch rotates from the lock position to the housing position, whereby the first ring-shaped part abuts a larger surface area of the second ring-shaped part when the latch is in the housing position than when the latch is in the lock position.

2. The electronic device according to claim 1, wherein the first ring-shaped part and the second ring-shaped part are formed such that the heights are continuously changed from a first position to a second position on a circumference,
    when the latch is located at the lock position, a comparatively high portion of the first ring-shaped part and a comparatively low portion of the second ring-shaped part of the rotation shaft supporting part oppose to each other, and a comparatively low portion of the first ring-shaped part and a comparatively high portion of the second ring-shaped part oppose to each other, and
    when the latch is located at the housing position, the comparatively high portion of the first ring-shaped part and the comparatively high portion of the second ring-shaped part of the rotation shaft supporting part abut on each other.

3. The electronic device according to claim 1, wherein the housing position is a position rotated by 180 degrees from the lock position.

4. The electronic device according to claim 1, wherein the first unit has an input part, and the second unit has a display.

5. The electronic device according to claim 1, wherein the electronic device is any of a notebook type personal computer, a detachable type computer, a word processor, and an electronic dictionary.

6. The electronic device according to claim 1, wherein the first ring-shaped part and the second ring-shaped part are configured to abut one another, when the latch is in the housing position, such that friction between the first ring-shaped part and the second ring-shaped part suppresses rotation of the latch from the housing position, whereby the abutment of the first ring-shaped part and the second ring-shaped part suppresses vibration of the latch.

7. The electronic device according to claim 1, wherein the first ring-shaped part and the second ring-shaped part are configured to abut one another, when the latch is in the housing position, such that a rotational friction between the first ring-shaped part and the second ring-shaped part decreases as the latch rotates from the housing position toward the lock position.

8. The electronic device according to claim 1, wherein when the latch is in the lock position the first ring-shaped part and the second ring-shaped part are spaced from one another by a gap circumscribing the rotation shaft.

9. A latch mechanism, in a device including a first unit and a second unit openable to the first unit, that fixes the second unit in a closed state with respect to the first unit, the latch mechanism comprising:

a latch rotatable around a rotation shaft between a housing position and a lock position, the latch fixing the first unit and the second unit in the closed state at the lock position; and a rotation shaft supporting part that rotatably supports the rotation shaft, wherein the latch has a first ring-shaped part disposed coaxially with the rotation shaft, the rotation shaft supporting part has a second ring-shaped part disposed coaxially with the rotation shaft, and heights of the first ring-shaped part and the second ring-shaped part are set such that an area of abutment between the first ring-shaped part and the second ring-shaped part increases as the latch rotates from the lock position to the housing position, whereby the first ring-shaped part abuts a larger surface area of the second ring-shaped part when the latch is in the housing position than when the latch is in the lock position.

10. The latch mechanism according to claim 9, wherein the first ring-shaped part and the second ring-shaped part are configured to abut one another, when the latch is in the housing position, such that friction between the first ring-shaped part and the second ring-shaped part suppresses rotation of the latch from the housing position, whereby the abutment of the first ring-shaped part and the second ring-shaped part suppresses vibration of the latch.

11. The latch mechanism according to claim 9, wherein the first ring-shaped part and the second ring-shaped part are configured to abut one another, when the latch is in the housing position, such that a rotational friction between the first ring-shaped part and the second ring-shaped part decreases as the latch rotates from the housing position toward the lock position.

12. The latch mechanism according to claim 9, wherein when the latch is in the lock position the first ring-shaped part and the second ring-shaped part are spaced from one another by a gap circumscribing the rotation shaft.

* * * * *

UNITED STATES PATENT AND TRADEMARK OFFICE
CERTIFICATE OF CORRECTION

| | |
|---|---|
| PATENT NO. | : 10,545,539 B2 |
| APPLICATION NO. | : 15/951443 |
| DATED | : January 28, 2020 |
| INVENTOR(S) | : Kenichi Shindo, Futoshi Kuriyama and Tatsuo Kuromoto |

It is certified that error appears in the above-identified patent and that said Letters Patent is hereby corrected as shown below:

On the Title Page

Item (72), "Kenchi Shindo" should read -- Kenichi Shindo --.

Signed and Sealed this
Twelfth Day of May, 2020

Andrei Iancu
*Director of the United States Patent and Trademark Office*